United States Patent Office 3,470,989
Patented Oct. 7, 1969

3,470,989
PRESS BRAKES
Daniel Jeavons, Coseley, near Bilston, Staffordshire, England, assignor to Taylor & Challen Limited, Birmingham, England, a British company
Filed Dec. 6, 1967, Ser. No. 688,554
Claims priority, application Great Britain, Dec. 6, 1966, 54,504/66
Int. Cl. F16d *49/10;* B60l *7/00;* B67b *3/26*
U.S. Cl. 192—130                                    2 Claims

ABSTRACT OF THE DISCLOSURE

In a mechanically-driven press brake the brake is applied at any instant in the cycle by a signal resulting from the presence of the operator's hands and is applied by engaging a dog-clutch driven from the rotating parts of the press so that the brake-applying force is derived from the movement of the ram or slide. The clutch has fine teeth so that the engagement of the brake is almost instantaneous.

---

Figure 1:
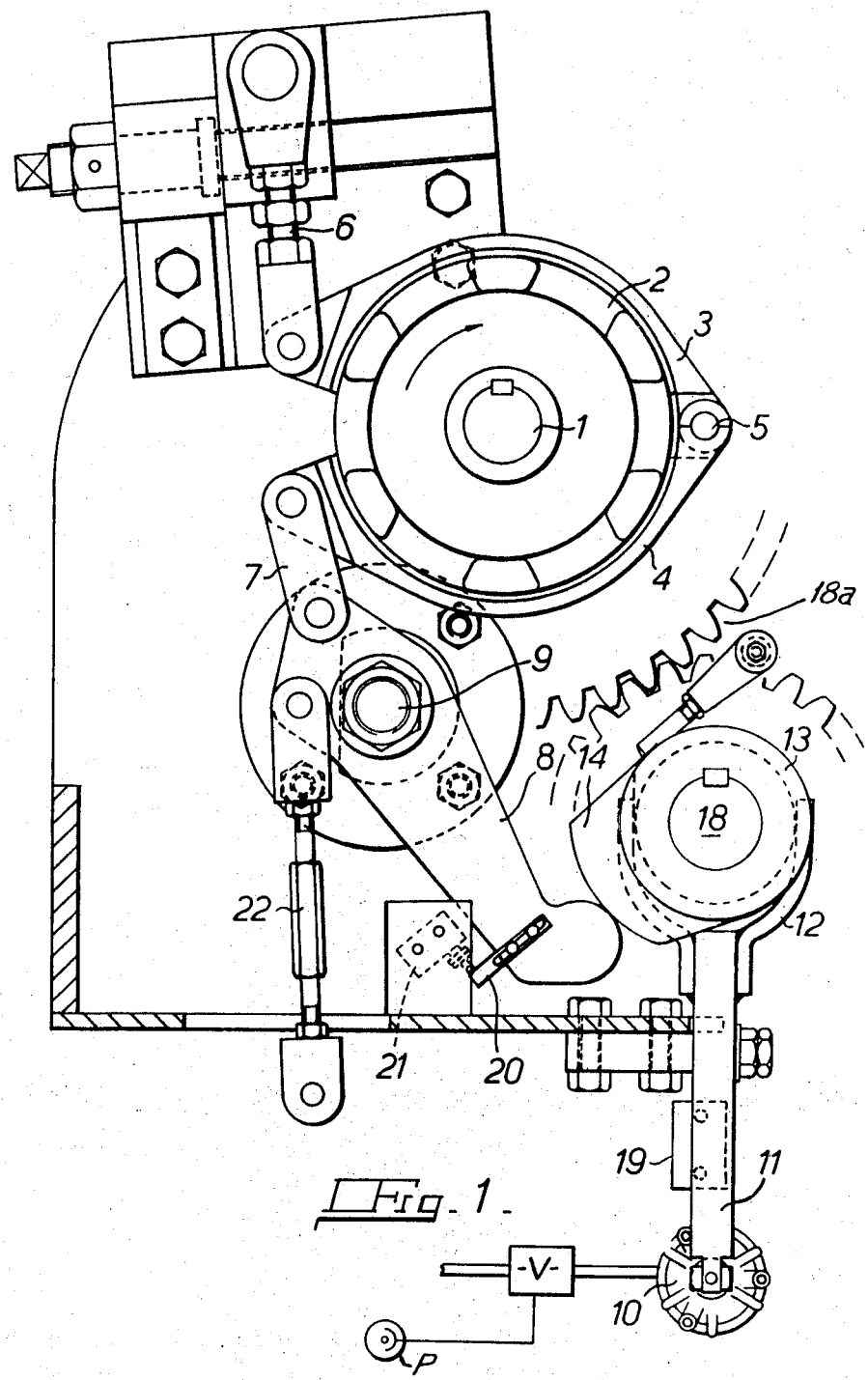

This invention relates to safety equipment for press brakes. Whereas in normal power-driven presses it is possible to provide a guard which prevents the operator's hands reaching the tools when the press is running and which is linked to the driving mechanism so that the press cannot be started unless the guard is closed, this is generally not possible in press brakes, in which the operator often has to inch the ram down, adjusting the position of the work in stages between movements of the ram. It is still necessary to provide some kind of protection so that the ram cannot be moved while the operator's hands are in the way, but this is not easy to provide, as it must operate almost instantaneously and at any point in the cycle.

It is known both in press brakes and in ordinary hydraulic, mechanical or other power presses and also in other machine tools, to use sensing devices employing photo-electric cells, ultrasonic beams, mechanical feelers and such like to detect the presence of the operator's hands and to bring the machine to a halt. However, the inertia involved is very substantial, especially in presses or press brakes having large flywheels, and it is very difficult to bring the machine to a halt rapidly enough at any point in the cycle to avoid danger to the operator, despite efforts involving reversal of the current to the driving motor, and the application of electromagnetic brakes.

It is the aim of the present invention to overcome this problem and to be able to bring the machine to a halt almost instantaneously at any point in the cycle. According to the invention in a mechanically driven press brake having a crankshaft, a sensing device detecting the presence of the operator's hands or arms controls a clutch which, on actuation, couples a mechanical brake-applying mechanism to a rotating shaft of the press (it may be the crankshaft itself) so that the brake-applying force is derived from the very movement which it is desired to brake. The brake itself can be mounted on the crankshaft or, in the case of a geared press brake, on the driving shaft and may be of a known kind with external shoes actuated through a toggle linkage. One of the links of the toggle is extended to form a lever and the brake-applying mechanism can take the form of a cam coaxial with the crankshaft or driving shaft and normally stationary. A signal from the sensing device engages a clutch to couple the cam to the rotating shaft, the cam engages the end of the lever, and the brake is applied. The brake may be the normal brake already provided on the machine, and the lever can include another arm acted on by a compressed air cylinder or other normal actuating device.

The clutch is preferably mechanical and simply comprises two members with mating toothed faces, preferably of saw-tooth profile so that after operation of the safety device in an emergency it is possible to turn the driving shaft back to release the brake. The pitch of the teeth is fine enough to avoid any appreciable delay before the clutch becomes engaged. One of the two members is slidable axially to engage the clutch, being moved through a lever by a solenoid, pneumatic cylinder or other device energised by the alarm signal from the sensing device.

Unlike known devices, the equipment according to the invention uses the movement of the driving shaft or crankshaft itself to provide the actuating force that applies the brake, and accordingly the greater the speed of rotation at the instant of receipt of the signal, the greater is the force with which the brake is applied. Very high applying forces can be developed, and the movement is halted equally well regardless of the position reached in the operating cycle.

Figure 2:
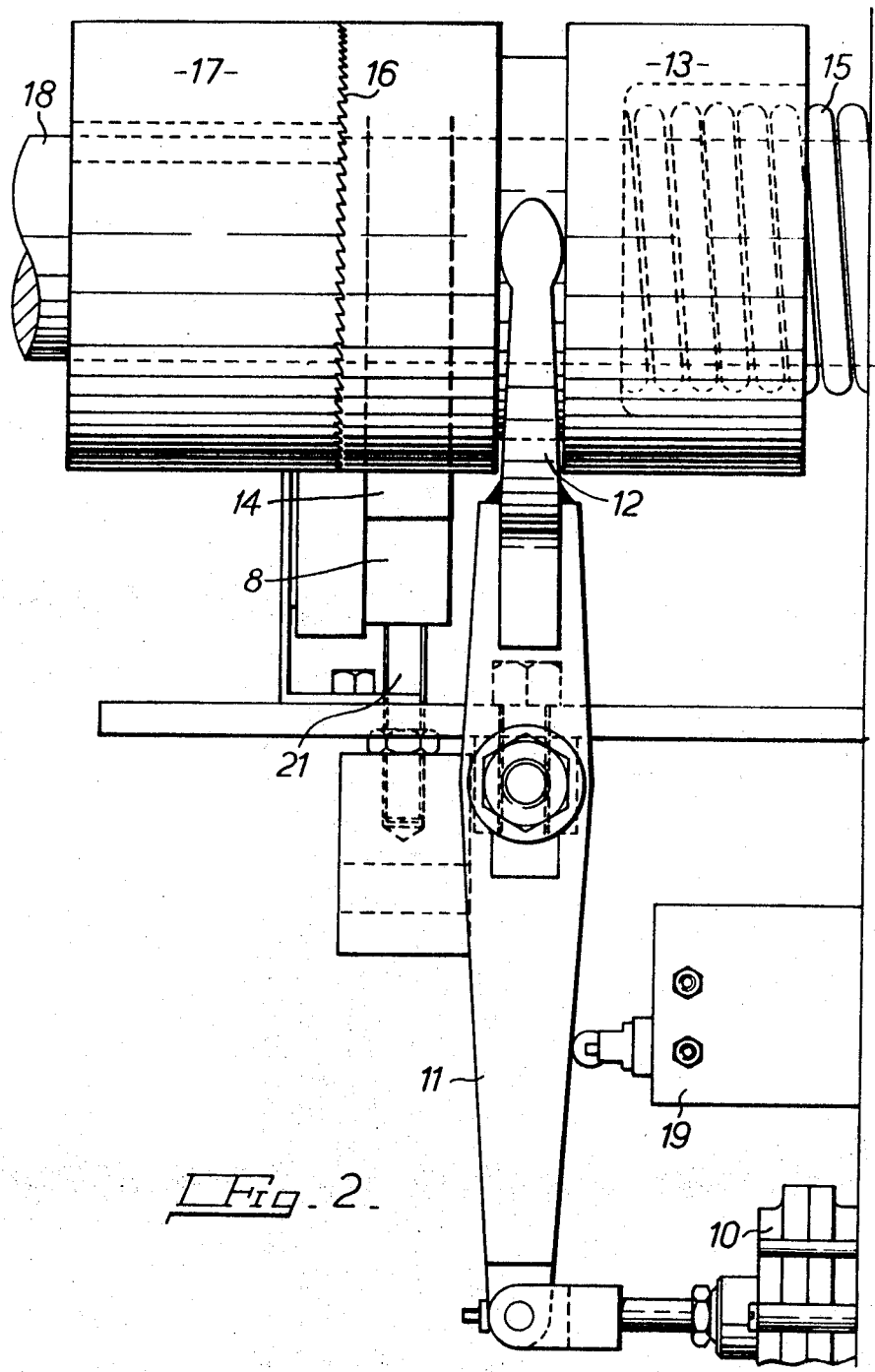

The invention will now be further described by way of example with reference to the accompanying drawings, in which:

FIGURE 1 is a side elevation of parts of the press brake showing the brake and its actuating linkage, the parts being in the positions they occupy when the emergency brake has been applied; and FIGURE 2 is a view to a larger scale than FIGURE 1 looking from the right in FIGURE 1 but showing only the lower part, and illustrates the means for initiating application of the brake.

The press brake itself is not illustrated, being of known construction and for an understanding of the present invention it will be sufficient to know that it involves a tool blade or slide which moves downwards under the action of cranks or eccentrics on a rotating crankshaft, to deform a sheet metal or other workpiece placed on the bed of the machine by an operator. As the operator often has to adjust the position of the workpiece carefully by hand as he inches the tool downwards, in order to ensure that the tool will engage the right point on the workpiece, it is very difficult to employ a normal mechanical guard and it is known to use a beam of light or other radiation falling on a photo-electric cell and directed across the throat of the press so that, if the operator's hands come too close to the path of the descending tool the beam will be interrupted and relays connected to the photo-electric cell will apply a brake. However, the inertia of the heavy moving parts is very substantial and a normal brake will generally not be able to bring the press to a halt in time to prevent injury.

In the arrangement illustrated the crankshaft of the press brake is shown at 1 and carries a brake drum 2 embraced by a pair of external brake shoes 3 and 4. The two shoes are connected together at one end of each by a floating pivot 5 and the other end of the shoe 3 engages a fixed abutment through a strut 6 of adjustable length. The other end of the shoe 4 is connected to a toggle linkage formed by a short link 7 and by a portion of a two-armed lever 8 pivoted about a fixed axis 9. It will be readily understood that, if the lever 8 is turned clockwise about the axis 9 into the position shown in FIGURE 1 the toggle linkage will come into the nearly aligned condition shown and the associated end of the shoe 4 will be urged towards the drum 2. As the drum normally rotates in a clockwise direction as indicated by the arrow in FIGURE 1 there is a substantial degree of self-servo or self-wrapping action in the resultant braking effect of the shoes 3 and 4 on the drum 2.

The electric signal from the photo-electric cell or other warning device indicated at P is used to energise a solenoid valve V in a compressed air circuit that exhausts air from a diaphragm-type actuator 10 connected to the lower end of a two-armed lever 11, pivoted at its midpoint, and having at its upper end a fork 12 engaging an annular groove in a sliding clutch member 13. This member is normally stationary and it carries on its periphery a cam surface 14 capable of engaging the lower end of the lever 8 of the brake-applying linkage. The actuator 10 is normally under air pressure and holds the lower end of the lever 11 over to the left as viewed in FIGURE 2, holding the clutch member 13 to the right against the action of a helical coil compression spring 15 to keep sawteeth 16 on its left-hand clear of mating teeth on a rotating member 17. This member is secured to a lay-shaft 18 which is geared to the crankshaft of the press brake by toothed gear 18a and in the present example the drive to the crankshaft is in fact obtained from the layshaft 18. Release of the air from the actuator 10 allows the spring 15 to move the clutch member 13 to the left so that the teeth 16 come into engagement with those on the rotating member 17. As soon as this happens the cam surface 14 moves round to the position shown in FIGURE 1, engaging the lever 8 and applying the brake. As the braking force is derived, via the clutch members 13 and 17, from the rotation of the crankshaft and its associated components and as there is added to the mechanical advantage of the lever 8 the further considerable mechanical advantage of the toggle linkage and the self-wrapping action of the shoes 3 and 4, the brake is applied with very great force and the crankshaft and tool are brought very rapidly to a halt. This happens regardless of the angular position of the crankshaft at the instant the signal is received from the photo-electric cell. It will also be observed that the pitch of the teeth of the clutch members 13 and 17 is unusually fine for this sort of clutch, and this ensures that there is negligible delay before the drive is being transmitted from the member 17 to the member 13 on energisation of the actuator 10.

A micro-switch 19 is engaged by a point on the lever 11 near its lower end on emergency operation of the brake and this acts directly or indirectly to interrupt the current to the driving motor of the press brake where, as is usual, it is electrically driven.

It will be appreciated that the layout described is "fail-safe" in that the brake-applying clutch is urged on the spring pressure and held off by air pressure, so that failure of the air pressure will result in the press being brought to a halt.

The lever 8 carries a striker 20 at its lower end and when the linings on the shoes become worn the travel of the lever 8 will increase to an extent such that this striker engages a micro-switch 21 to light a lamp and warn the operator, who can then take up the wear by adjustment of the link 6.

The brake comprising the shoes 3 and 4 acting on the drum 2 may also be used as a normal brake and for this purpose there is a strut 22 connected at its upper end to the lever 8 and with its lower end capable of being connected to a pneumatic cylinder or other actuating device.

Although we have referred to the warning means as comprising a photo-electric cell, it will be understood that the nature of the warning means is unimportant, as long as it can send a signal to the actuator 10 to engage the clutch and bring the press brake to a rapid halt at any instant in the cycle of the operator's hands are dangerously near the path of the tool.

I claim:
1. A mechanically driven press brake having a crankshaft driving a tool and provided with a sensing device to cause the application of braking means to bring the crankshaft to a halt in the event of the operator's hands being dangerously close to the path of the tool, the braking means being applied by a force derived from the rotation of a rotatable part coupled to the crankshaft itself, wherein the improvement comprises the feature of a serrated toothed clutch comprising two coaxial members, one of said members being fast with said rotatable part to rotate therewith, and the other of said members being fast with cam means and being normally stationary, and actuating means responsive to energization of said sensing device and serving, on energization of said device, to bring said clutch members into co-operative engagement to cause said other of said members and said cam to rotate with said one of said members, and cam follower means engaged by said cam on rotation of the latter, to apply said braking means.

2. A mechanically driven press brake as set forth in claim 1, wherein said actuating means comprise a combination of a spring urging said clutch members into mutual engagement and fluid-pressure means opposing the action of said spring, energisation of said sensing causing removal of fluid pressure from said fluid-pressure means, thereby to allow said clutch members to be brought into co-operative engagement by said spring.

References Cited

UNITED STATES PATENTS

| 2,058,668 | 10/1936 | Davis | 192—130 XR |
| 2,115,322 | 4/1938 | Wood | 192—130 |
| 2,798,583 | 7/1957 | Jeszka et al. | 192—130 |

FOREIGN PATENTS 727,914  4/1965  Great Britain.

CARLTON R. CROYLE, Primary Examiner

A. D. HERRMANN, Assistant Examiner

U.S. Cl. X.R.

100—53; 188—158; 192—2, 144